E. F. DONNELLY.
FLUSH VALVE.
APPLICATION FILED MAY 20, 1918.

1,299,692.

Patented Apr. 8, 1919.

Inventor.
Edward F. Donnelly
by Heard Smith & Tennant
Attys.

UNITED STATES PATENT OFFICE.

EDWARD F. DONNELLY, OF MALDEN, MASSACHUSETTS.

FLUSH-VALVE.

1,299,692.　　　　Specification of Letters Patent.　　Patented Apr. 8, 1919.

Application filed May 20, 1918. Serial No. 235,443.

*To all whom it may concern:*

Be it known that I, EDWARD F. DONNELLY, a citizen of the United States, residing at Malden, county of Middlesex, State of Massachusetts, have invented an Improvement in Flush-Valves, of which the following description, in connection with the accompanying drawing, is a specification, like characters on the drawing representing like parts.

This invention relates to flush valves such as are used in water-closet flush tanks, and it has for its object to provide a novel flush valve which is simple and inexpensive to manufacture and which can be used either as a cage valve or as a siphon valve.

The siphon valve that is now commonly used is much more expensive than the cage valve, and as there are some places in most plumbing installations where the cage valve will answer just as well, it is customary to use cage valves at such places and siphon valves at other places.

My improved valve, which can be used either as a siphon valve or as a cage valve, will meet all the requirements of any plumbing installation and hence it will not be necessary to use two different types of valves.

In order to give an understanding of my invention, I have illustrated in the drawings a selected embodiment thereof which will now be described, after which the novel features will be pointed out in the appended claims.

1 indicates a flush tank having a discharge or waste pipe 2 connected therewith through a tubular fitting 3 which extends through the bottom of the tank as usual, and 4 is the supply pipe which leads to the usual ball-cock 5 that controls the supply of water to the tank.

Figure 4:
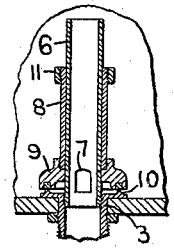
Fig. 4 shows the valve device adjusted to act as a cage valve.
Figure 2:
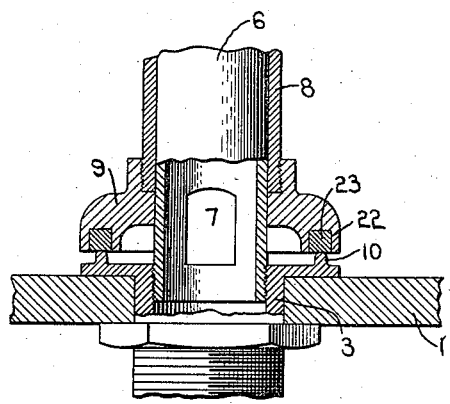
Fig. 2 is an enlarged section through the valve member.
Figure 3:
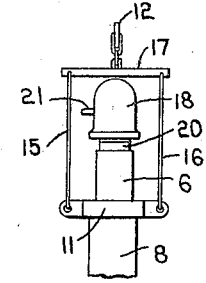
Fig. 3 is a side view showing the connection between the operating lever and the valve member.

Secured to and rising from the fitting 3 is a tubular member 6 which is provided with one or more discharge ports 7 situated close to the bottom of the tank. Slidably mounted on the tubular member 6 is a sleeve 8 which is provided at its lower end with a valve member 9 that encircles the tubular guiding member 6 and is adapted to seat on an annular valve seat 10 formed on the fitting 3. The sleeve 8 is connected to the operating lever 12 which is shown as pivoted at 13 to a bracket 14 secured to the top of the tank 1 and which has the usual pull-cord or chain (not shown) fastened thereto. Any suitable connection between the lever 12 and sleeve 8 may be employed. I have herein shown the sleeve 8 as provided at its upper end with a collar 11 which is connected with a yoke 17 by two links 15 and 16, the yoke 17 being secured to the end of the lever 12. So long as the valve member 9 engages the seat 10 the ports 7 will be closed against the discharge of water therethrough, but when the valve member 9 is raised off its seat then the water can flow beneath the valve member and through the ports 7 to the discharge pipe 2. When the valve comprises simply the parts above described it will operate as a cage valve, as shown in Fig. 4, for when the cord or string is pulled to operate the lever 12, the valve 9 will be raised, thus allowing the water to be discharged through the discharge port 7 so long as the valve is held raised. When the pull on the string or cord is released, the weight of the valve will cause it to gravitate to the seat 10 again, thus shutting off the flow of water from the tank.

Figure 1:
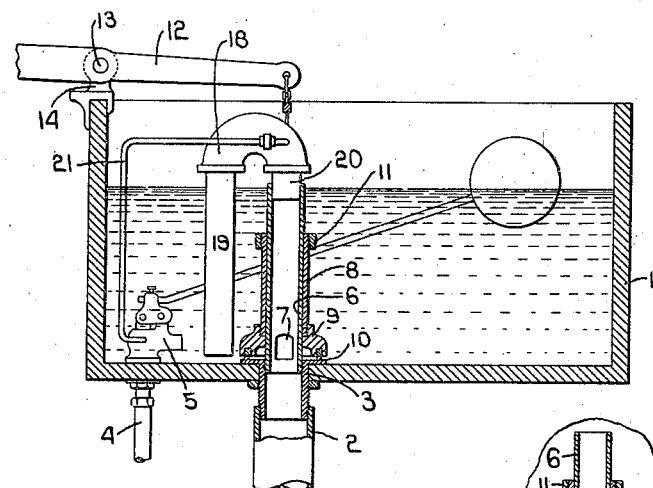
Figure 1 is a vertical sectional view through a flush tank showing my improved valve adjusted to act as a siphon valve.

In order to convert the flush valve into a siphon valve, I employ a siphon member 18 having the long arm 19 and the short arm 20. The short arm 20 is of a size to fit into the upper end of the tubular member 6, as shown in Fig. 1, and the long arm 19 is of a length to extend substantially to the bottom of the tank 1. When the siphon member 19 is employed as shown in Fig. 1, the raising of the valve 9 will start a flow of water through the ports 7 which will produce sufficient suction when the valve is closed again to start the siphon in action, and after the siphon has once started, then the water will be continued to be siphoned out of the tank until the siphon is broken by air entering the lower end of the longer leg 19. The presence or absence of the siphon member 18 thus determines whether the valve will operate as a siphon valve or as a cage valve.

21 designates a refill pipe connected at one end to the ball-cock and at the other end to the siphon member 18. The purpose of this pipe is to provide a sufficient flow of water while the tank 1 is filling after it has been emptied to fill the trap in the watercloset bowl. This pipe is so connected to the ball-cock that water will flow therethrough so long as water is flowing through the ball-cock, but when the float of the ball-cock rises to a point to close the latter, then the flow of water through the pipe 21 will also be stopped.

It will be seen from the above that the operation of changing my improved valve from a cage valve to a siphon valve involves merely the addition of the siphon element 18 to the pipe 6 and, if desired, the installation of the pipe 21. Similarly the conversion of the flush valve from a siphon valve to a cage valve involves merely the removel of the siphon element 18 and pipe 21. Since the end 20 of the siphon element fits into the upper end of the pipe 6 with a sliding fit, the operation of connecting the siphon element to or disconnecting it from said pipe is a very simple matter.

With my invention it will be necessary to use only one type of flush valve and any installation may be made to act either as a siphon valve or as a cage valve, depending upon whether the siphon element 18 is used or not. The device moreover is very simple in construction and has few parts and is correspondingly inexpensive to manufacture.

The valve 9 may be made in any suitable way. I have herein shown it as provided with an annular groove or recess 22 which is filled with some relatively soft material, such as copper or composition that will seat well on and make a tight joint with the valve seat 10.

I claim:

1. In a flush valve, the combination with a valve seat member having a discharge pipe connected thereto, of a tubular member rising from the valve seat member and provided with a discharge opening adjacent the valve seat, a sleeve slidably mounted on the tubular member, a valve member secured to the lower end of the sleeve and adapted to engage the valve seat member, means for raising and lowering the sleeve thereby to open and close the valve, and a siphon member detachably secured to the upper end of the tubular member whereby the presence of the siphon member will cause the valve to operate as a siphon valve and the absence of said siphon member will cause the valve to operate as a cage valve.

2. In a flush valve, the combination with a valve seat member having a discharge pipe connected thereto, of a tubular member rising from the valve seat member and provided with a discharge opening adjacent the valve seat, a sleeve slidably mounted on the tubular member, a valve member secured to the lower end of the sleeve and adapted to engage the valve seat member, means for raising and lowering the sleeve thereby to open and close the valve, and a siphon member having a short leg adapted to fit into the upper end of the tubular element and a long leg extending substantially to the valve seat whereby the valve will operate as a cage valve when the siphon member is removed and as a siphon valve when the siphon member is in place.

In testimony whereof, I have signed my name to this specification.

EDWARD F. DONNELLY.

Copies of this patent may be obtained for five cents each, by addressing the "Commissioner of Patents, Washington, D. C."